United States Patent
Chiodini et al.

(10) Patent No.: US 9,998,204 B2
(45) Date of Patent: Jun. 12, 2018

(54) METHOD OF TRANSMITTING FLIGHT DATA RECORDED BY A BLACK BOX OF AN AIRCRAFT BY A RADIOELECTRIC BEAM WHOSE DIRECTIVITY CHANGES IF A CRITICAL STATE OF THE AIRCRAFT IS DETECTED

(71) Applicant: Safran Electronics & Defense, Boulogne-Billancourt (FR)

(72) Inventors: Alain Chiodini, Boulogne-Billancourt (FR); Denis Delville, Boulogne-Billancourt (FR); Philippe Riviere, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days. days.

(21) Appl. No.: 15/300,224

(22) PCT Filed: Mar. 31, 2015

(86) PCT No.: PCT/EP2015/056996
§ 371 (c)(1),
(2) Date: Sep. 28, 2016

(87) PCT Pub. No.: WO2015/150369
PCT Pub. Date: Oct. 8, 2015

(65) Prior Publication Data
US 2017/0141839 A1    May 18, 2017

(30) Foreign Application Priority Data
Mar. 31, 2014 (FR) ..................... 14 52784

(51) Int. Cl.
*H04B 7/185* (2006.01)
*B64D 45/00* (2006.01)

(52) U.S. Cl.
CPC ......... *H04B 7/18506* (2013.01); *B64D 45/00* (2013.01); *B64D 2045/0045* (2013.01); *B64D 2045/0065* (2013.01); *H04B 7/18508* (2013.01)

(58) Field of Classification Search
CPC ............ B64D 45/00; B64D 2045/0045; B64D 2045/0065; H04B 7/18506; H04B 7/18508; H04W 84/06
See application file for complete search history.

(56) References Cited

U.S. PATENT DOCUMENTS 6,094,165 A * 7/2000 Smith .................. H04B 7/0408
342/361
6,385,513 B1 * 5/2002 Murray .............. H04B 7/18508
340/945

(Continued)

FOREIGN PATENT DOCUMENTS

FR 2967542 A1 5/2012

OTHER PUBLICATIONS

Search Report and Written Opinion in French Application No. 1452784 dated Dec. 10, 2014, with English translation coversheet. 9 pages.

(Continued)

*Primary Examiner* — Duc M Nguyen
(74) *Attorney, Agent, or Firm* — Womble Bond Dickinson (US) LLP

(57) ABSTRACT

There is proposed a method of in-flight transmission of data recorded by a black box of an aircraft (1), the method comprising the emission (600) by the aircraft (1) of a radioelectric beam (F1, F2) transporting said data according to a first directivity (D1) if at least one predetermined parameter does not indicate a critical state of the aircraft (1), and according to a second directivity (D2) different from the (Continued)

first directivity (D1) if the predetermined parameter indicates a critical state of the aircraft (1).

14 Claims, 3 Drawing Sheets

(56) References Cited

U.S. PATENT DOCUMENTS

| | | | |
|---|---|---|---|
| 6,453,177 B1* | 9/2002 | Wong | H01Q 1/246 455/450 |
| 8,013,790 B2* | 9/2011 | Uno | H04W 16/28 342/367 |
| 2003/0135311 A1 | 7/2003 | Levine | |
| 2003/0225492 A1* | 12/2003 | Cope | G07C 5/008 701/33.4 |
| 2005/0187677 A1* | 8/2005 | Walker | B64C 13/20 701/16 |
| 2005/0221838 A1* | 10/2005 | Cha | H04B 7/0408 455/452.2 |
| 2005/0285803 A1* | 12/2005 | Iacono | H04W 16/24 343/702 |
| 2010/0271198 A1* | 10/2010 | Boling | B60R 25/102 340/539.1 |
| 2011/0032149 A1 | 2/2011 | Leabman | |
| 2011/0095914 A1* | 4/2011 | Velado | B63J 99/00 340/984 |
| 2012/0007750 A1* | 1/2012 | Gorabi | B63B 43/00 340/984 |
| 2012/0191273 A1* | 7/2012 | Jacobs | H04B 7/18508 701/3 |
| 2013/0145482 A1* | 6/2013 | Ricci | G06F 9/54 726/28 |
| 2013/0244588 A1 | 9/2013 | Pereira | |
| 2013/0317673 A1* | 11/2013 | Leroy | H04B 7/18506 701/14 |

OTHER PUBLICATIONS

International Search Report and Written Opinion in PCT/EP2015/056996 dated Jul. 2, 2015, with English translation. 12 pages.

* cited by examiner

METHOD OF TRANSMITTING FLIGHT DATA RECORDED BY A BLACK BOX OF AN AIRCRAFT BY A RADIOELECTRIC BEAM WHOSE DIRECTIVITY CHANGES IF A CRITICAL STATE OF THE AIRCRAFT IS DETECTED

GENERAL FIELD

The invention relates to the field of flight recorders loaded onboard aircraft and commonly referred to under the term of "black boxes".

The invention more particularly relates to a method for transmitting in flights, flight data of the type of those collected by these recorders.

STATE OF THE ART

In accordance with air regulations, aircrafts are today equipped with devices allowing flight data to be collected and stored in memory as well as audio communications. These devices are usually referred to under the term of "flight recorder", or "black boxes" or "crash recorders". In the case of an incident, or even an accident of an aircraft, the content of its flight recorders is typically analyzed on the ground so as to determine the origin of the incident or of the accident having occurred on the aircraft.

Regulatory flight recorders therefore have to be exceptionally resistant (typically withstand temperatures of the order of 1,500 degrees, accelerations of 3,000 g, . . . ), to be capable of recording voluminous data and occupying a limited space and with a reduced weight.

However, these recorders remain destructible and may not be able to be recovered after an accident of an aircraft in the open sea.

In order to circumvent these problems, methods for transmitting data ordinarily collected by flight recorders have already been proposed from a first aircraft in flight towards a second flying aircraft. The data are transmitted from aircraft to aircraft until a ground storage station is attained.

PRESENTATION OF THE INVENTION

The invention is therefore directed to providing different strategies for transmitting in flight, from aircraft to aircraft, data recorded by a black box.

Consequently, a method for transmitting in flight data recorded by a black box of an aircraft is proposed, the method comprising the emission by the aircraft of a radioelectric beam conveying said data along a first directivity if at least one predetermined parameter does not indicate a critical condition of the aircraft, and along a second directivity different from the first directivity if the predetermined parameter indicates a critical condition of the aircraft.

The radioelectric beam emitted by the application of this method propagates from the aircraft in an angular segment of the space which is determined by the selected directivity for the emission.

An adjustment along a low directivity will allow propagation of the data in a wide angular segment, and therefore transmission of the data, properly to more aircraft localized in angular positions away from each other, with respect to the data emitting aircraft.

On the contrary, an adjustment along a great directivity will allow propagation of the data in a narrower angular sector (this is then referred to as directional propagation). Such directional propagation gives the possibility of increasing the radioelectric range, allowing the use of modulations of a higher order (64-QAM rather than BPSK for example) for transmitting a greater volume of data, and reducing the level of co-channel interferences.

The proposed method is therefore particularly flexible since it allows several strategies for emitting data of the black box type by adapting the data propagation conditions according to the internal situation (condition of the aircraft) and/or external situation (weather conditions having an influence on the quality of the data transmission).

In an embodiment, the second directivity is smaller than the first directivity. It is thus preferred in a critical situation of the aircraft, relatively seldom, an emergency strategy aiming at attaining more addressee aircraft, and in a situation of proper operation of the aircraft, which is more frequent, a strategy of focused directional transmission, with more energy savings.

The emission of the radioelectric beam along the first directivity may be applied in response to the detection of the position of another flying aircraft within radioelectric range, the emitted radioelectric beam then being oriented towards the detected position. Black box type data are then exclusively emitted when this proves to be useful, i.e. exclusively when an addressee aircraft is identified as an addressee, which gives the possibility of further reducing the energy consumption dedicated to the transmission of said data. Moreover, the directivity may then be adjusted to a reduced value in so far that the beam is directed towards the addressee aircraft.

The emission of the radioelectric beam along the second directivity may further be advantageously repeated over time, for example until the landing of the aircraft.

Moreover, the emission of the radioelectric beam along the second directivity may be omnidirectional, so as to emit in 360° in free space and thereby increase the likelihood of proper transmission of the data to all the aircraft within range, known or unknown, by the emitting aircraft.

The radio beam may also be emitted according to a first power if the parameter does not indicate a critical condition, and according to a second power greater than the first power if the parameter indicates a critical condition.

The determined parameter may further be emitted in the radioelectric beam.

Moreover, the emitted radioelectric beam may be generated by:

- activation of a set of antennas of the aircraft, if the parameter does not indicate a critical condition of the aircraft, and
- selective activation of a sub-set of the set of antennas, if the parameter indicates a critical condition of the aircraft.

Each activated antenna then generates a radioelectric signal which contributes to forming the radioelectric beam.

Each antenna may be an omnidirectional antenna.

Each radioelectric signal generated by an activated antenna may convey a copy of the same data recorded by the black box if the parameter indicates a critical condition of the aircraft. Alternatively, the method comprises splitting the data recorded by the black box into several data flows, and each antenna generates a radioelectric signal conveying one of the data flows if the parameter indicates a critical condition of the aircraft.

Each radioelectric signal generated by an antenna may further be emitted in a distinct frequency channel.

DESCRIPTION OF THE FIGURES

Other features, objects and advantages of the invention will become apparent from the following description, which is purely illustrative and non-limiting, and which should be read with reference to the appended drawings wherein.

On the whole of the figures, similar elements bear identical references.

DETAILED DESCRIPTION OF THE INVENTION

Figure 1:
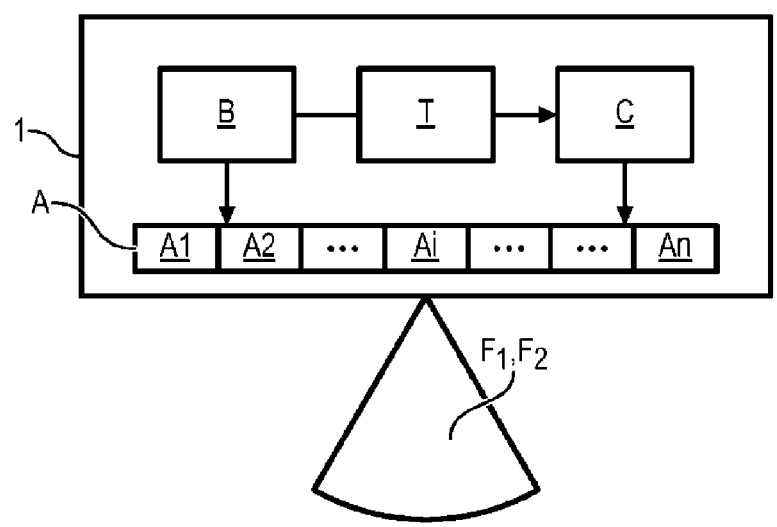
FIG. 1 schematically illustrates an aircraft according to an embodiment of the invention.

With reference to FIG. 1, an aircraft 1 comprises a flight recorder B, a processing module T, a control module C, and an emitter A of radioelectric beams.

The recorder B, or "black box", is a well-known device suitable for collecting and storing representative data of the flight conditions of the aircraft 1.

The expression "flight data" will designate here data collected by the flight recorder, for example the regulatory flight data will allow emission of a diagnostic on the flight conditions of the aircraft 1.

The flight recorder may on the one hand be suitable for recording voice-only channels: four "audio" channels are recorded (pilot, copilot, atmosphere onboard the cabin and conversations with air control). The recording should give the possibility of restoring the last two hours preceding an accident.

An audio channel typically has a maximum binary throughput of 32 kbit/s, the data volume produced per second is then: 4 audio channels times 32 kbit/s+1 data channel times 2 kbit/s=130 kbit/s i.e. 468 Mbit per hour.

The audio data are acquired on audio analog lines.

The flight recorder B may on the other hand be suitable for recording data: a "data" channel is recorded. Up to 88 parameters may be saved (including some which are the vertical acceleration or IVV, for "Inertial Vertical Velocity", for example at the rate of 16 Hz) which represents about 1,024 data of 12 bits (extended to 16 bits) per second; the corresponding binary throughput is therefore 2 kilobytes per second. The recording may be provided for restoring the last twenty-five hours preceding an accident.

The flight recorder B typically comprises a bulk memory of the FLASH memory type. The information is circularly shared between several distinct memory components.

The data (flight parameters) are acquired via a series link and sent to the flight recorder B by means of a modulation of the PCM type.

The flight recorder B may also be suitable for recording both voice data and the flight data.

The diagnostic module T is connected to the flight recorder B. It may be configured for analyzing the data collected by the flight recorder B and infer therefrom one or several parameters indicating that the aircraft is in a critical condition or not. Alternatively, the aforementioned parameter is part of the data collected by the flight recorder B and no inference is carried out by the diagnostic module T.

In the present text, "critical condition" means a condition corresponding to a catastrophic situation for the aircraft, in the sense of air traffic regulations. The aircraft 1 may enter a critical condition in several cases: if one or several pieces of equipment of the aircraft are subject to damage (damage condition) and/or in the case of a piloting error (pilot error condition).

In particular an alarm parameter of the cockpit, such as a sound alarm (stalling alarm, fire alarm, etc.), a light alarm ("master warning") may in particular but not exclusively be used as a parameter, used by the diagnostic module T. Also, specific logic operations may also be carried out for identifying the critical condition of the aircraft 1.

The emitter A is adapted for emitting a radioelectric signal forming a beam in space and adapted for receiving such a beam.

The emitter A is adaptive, i.e. it has at least one variable operating parameter comprising at least the directivity of the emitter A in radioelectric emission.

In the following, the term of "directivity" refers to an operating parameter of the emitter A which determines an angle of the angular sector of space (or at least in a plane such as the azimuthal plane of the aircraft) wherein the emitted radioelectric beam propagates. The smaller the directivity of the emission means A, the greater is the angle of the angular sector of the beam.

The operating parameters may also comprise the overall emission power of the radioelectric beam generated by the emitter A.

The control module C is configured for adjusting the operating parameters of the emitter A depending on the value or on the parameter(s) obtained by the diagnostic module T.

The aircraft may also comprise means for encrypting the collected data.

Data Transmission Method

Figure 2:
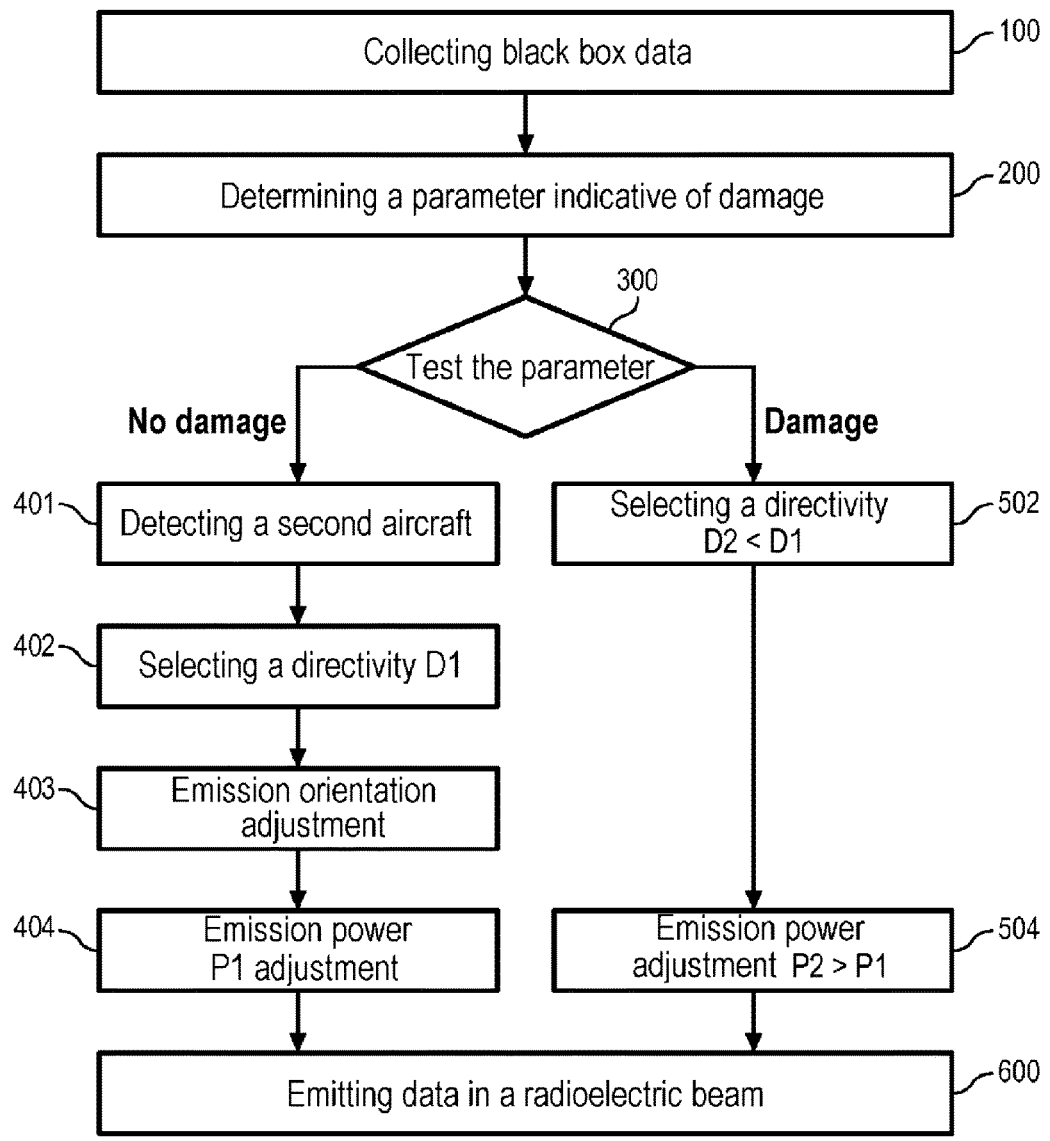
FIG. 2 is a flow chart of steps of a method for transmitting data according to an embodiment of the invention.

The different steps of a method for transmitting black box type data of the aircraft 1 will now be described with reference to the flow chart of FIG. 2.

In a step 100, the flight recorder B collects flight data of the aircraft 1. This step may typically be carried out continuously during the flight of the aircraft 1.

In a step 200, at least one parameter indicative of a critical condition of the aircraft is determined by the diagnostic module T from the data transmitted to the flight recorder B. Each determined parameter may be indicative of a critical condition relating to the aircraft. For example it may be considered that the aircraft undergoes a critical condition if at least one parameter indicates a "catastrophic situation".

In a step 300, the diagnostic module tests the value of the determined parameter. This parameter may typically be a Boolean variable having a value OK indicative of the absence of a critical condition or else a value NOK indicative of the presence of a critical condition.

Alternatively, in this step 300, the module T applies, from the monitoring of the data which are recorded in the flight recorder, the detection of this critical state condition by means of a dedicated computer program having access to the contents of the flight recorder B.

Case of the Absence of a Critical Condition

Figure 3:
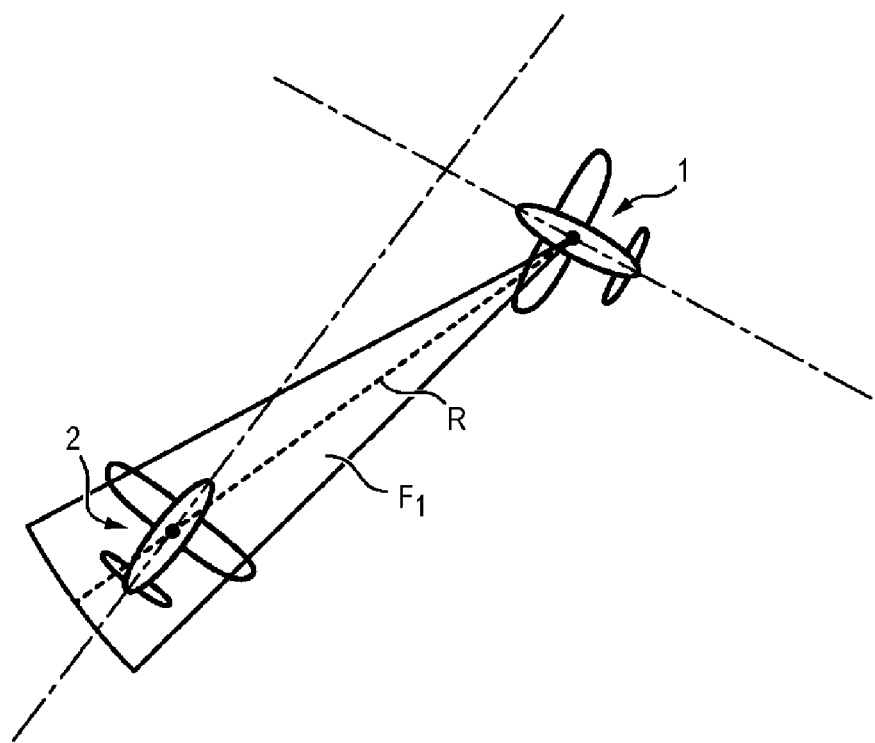
FIGS. 3 and 4 illustrate the aircraft of FIG. 1 in two flight situations.
Figure 4:
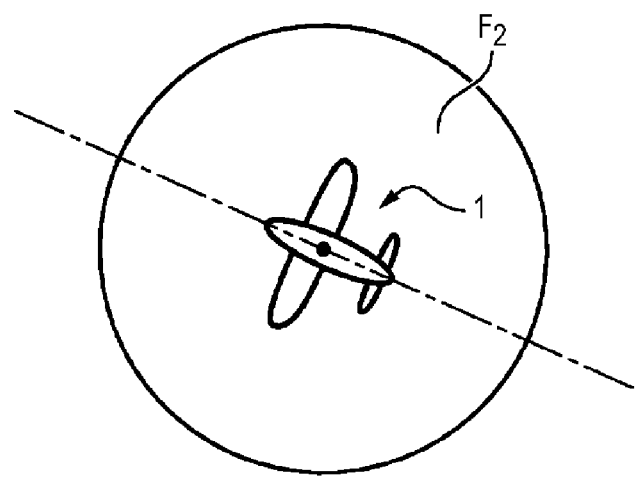

If the tested parameter indicates that the aircraft is not subject to a critical condition, a step 401 for detecting the position of a second aircraft 2 within range of the emitter A is applied (this situation is illustrated in FIG. 3).

This detection step 401 may be applied in diverse known ways by one skilled in the art. For example, the trajectory of an aircraft is typically determined before its takeoff. Moreover it will be assumed that the aircraft 1 has means allowing it to be aware of a new trajectory if this aircraft is found for one reason or another deviated from its initially intended trajectory.

It is therefore possible to determine in advance a number of aircrafts 2 crossing the trajectory of the aircraft 1. An estimation of the minimum distance which will separate the aircraft 1 and 2 during their respective flights may therefore be also estimated, as well as an estimation of the instant at which this minimum distance occurs.

The detection 401 may be dynamically applied by means of a plurality of omnidirectional antennas described later on in the present document. Standard numerical processing algorithms like MUSIC ("Multiple Signal Classification") and/or ESPRIT ("Estimation of Signal Parameters via Rotational Invariance Techniques") may be successively used in this case. The estimation of the direction of the emitting aircraft is all the more accurate since the impulse response of the transmission channel is simple, the aircraft being directly visible without (or with very few) multi-paths.

If several aircrafts 2 are detected 401, the aircraft receiving the data may be selected on the base of a metric comprising for example the intensity of the received signal (RSSI) and/or an estimation of the potential transmission time.

Alternatively, the detection 401 may then be applied by reading through a table stored by the aircraft 1, the table comprising a crossing period by the aircraft 2 during which the aircraft 1 is within range of aircraft 2, by emitting a request by the aircraft 1 upon entering said crossing period, and the reception of a position response of the aircraft 2 emitted by the latter in response to the request.

Once the position of the second aircraft 2 is detected by the aircraft 1, the control module C adjusts the overall directivity in emission of the emitter A to a value D1, for example predetermined by the control module C. It will be considered that the directivity D1 is selected so as to produce a directional beam F1, as opposed to an omnidirectional beam F2 propagating at 360° in the azimuthal plane of the aircraft.

In a step 403, the control module C also adjusts the orientation of the direction of the emitter A (this direction is illustrated in FIG. 3 by a dotted line joining up the respective positions of both aircraft 1 and 2).

Steps 401 and 403 may be repeated several times so as to update the relative position of the aircraft 2 with respect to the aircraft 1 which is movable.

In a step 404, the control module C adjusts the emission power of the communications means to a value P1.

In a step 600, the emitter A emits a radioelectric beam F1 conveying all or part of the data collected by the flight recorder B.

Practically, the beam F1 forms a radioelectric "bubble", the extent of which depends on the radiated power.

The beam F1 covers a relatively narrow angular sector corresponding to the directivity D1, which allows improvement in the data transmission conditions towards this aircraft. The beam F1 is emitted towards the position of the aircraft 2, which gives the possibility of saving emission power.

The aircraft 1 and 2 are physically capable of exchanging data when they are both located in the space formed by the intersection of their respective radioelectric "bubbles". When such an event occurs, it is stated that the aircraft "cross each other". When both aircraft 1 and 2 cross each other in opposite directions, the minimum duration T of the possible communication period between both of these aircraft 1, 2 is T=2R/(V1+V2), where V1 is the speed of aircraft 1, V2 the speed of aircraft 2, and R the radius of their respective "bubbles" (which is assumed identical).

The data are then received by repeating means (not shown) of the aircraft 2.

These data collected by the aircraft 2 may then be subject to an analysis of the flight conditions of the aircraft 1, if the latter later experiences a critical condition or even an accident.

If it is assumed that R=30 km and that V1=V2=900 km/h, then T=120 s. The minimum binary throughput used during the radioelectric emission may then be greater than or equal to 3.9 Mbit/s, which is quite compatible with the performances of the existing OFDM standards (for example DVB) or of the $4^{th}$ generation phone standard (LTE-Advanced).

If the aircraft 1 is also suitable for receiving data collected by the flight recorder of the aircraft 2 (emitted by applying the method presently described), the minimum binary throughput is brought to 7.8 Mbit/s (if the aircraft 1 and 2 emit their respective data one after the other), which remains advantageously compatible with the performances of the standards mentioned above.

However, in practice, a minimum binary throughput of 2 Mbit/s is amply sufficient for transmitting the black box type data.

Case of the Presence of a Critical Condition

If the parameter indicates a critical condition of the aircraft, a special transmission procedure is applied, comprising the following steps.

In a step 502, the control module C adjusts the directivity of the emitter A to a value D2 of less than the value D1 selected in the case of proper operation of the apparatus as described earlier.

In a step 504, the control module C adjusts the emission power of the communications means to a value P2 advantageously selected to be greater than the power P1, so as to increase the range.

The emission step 600 is then applied for transmitting all or part of the data collected by the flight recorder B in a radioelectric beam F2 covering a greater angular sector than the one of beam F1.

The damage may then be analyzed on the basis of the data received by the aircraft 2 after their transmission; it is therefore advantageous that all the data collected by the flight recorder be emitted by the communications means A.

Preferably, the value D2 is a minimum value allowing omnidirectional propagation. The data thereby propagated at 360° are therefore more capable of being sensed by another aircraft, even an aircraft not having been subject to a detection 401, a detection which may actually be selective, or even exactly being affected by the damage to which the aircraft 1 is subject.

Moreover, the power P2 selected to be greater than the power P1 gives the possibility of increasing the range of the aircraft 1. Accordingly, the emitted data may be sensed by aircraft 2 which may not be attained when the emitter A is configured with the emission power P1. Further, by using a relatively high power P2 only when the aircraft undergoes a critical condition it is possible to reduce the electric consumption of the communications means A, and therefore that of the aircraft 1.

The emission of the data is here advantageously carried out in the case of the presence of a critical condition without awaiting detection of a second aircraft 2 flying near the first aircraft. This gives the possibility of advantageously reducing the elapsed time between the instant at which the diagnostic T module detects the catastrophic situation and the moment when the data collected by the flight recorder begin to be emitted by the communications means A. Now, the reduction of this duration may have utmost importance, especially if the catastrophic situation leads to the loss of the aircraft, and that the volume of the data collected by the flight recorder is large: the voluminous data collected by the flight recorder then risk being destroyed before their complete transmission.

Embodiment with a Network of Antennas

In an embodiment, the emitter A comprises a plurality of antennas A1-An forming a network as illustrated in FIG. 1. Each of the antennas Ai of this network is switchable, i.e. it may be activated or deactivated independently of the other antennas of the network by the control module C.

Each activated antenna emits a radioelectric signal, the whole of the radioelectric signals thereby forming the radioelectric beam F1, F2.

The plurality of antennas A1-An is connected to the flight recorder B via a radio system (not shown) suitable for converting a flow of binary data recorded by the flight recorder B into a plurality of radioelectric signals (one per antenna). This radio system may thus comprise basic stages, modulation, high frequency transition, filtering and/or amplification stages. Each antenna Ai may be omnidirectional. In this case, the directive beams are electronically formed by applying a set of complex gains to the signals intended to supply the table of antennas (these are referred to as adaptive or smart antennas). The smart antennas may detect and track the position of the addressee aircraft. They may also widen or narrow the beam of waves sent, by increasing or decreasing the power and multiply it in order to attain multiple addressees (if N is the number of antennas used, in practice it is estimated that N/2 distinct simultaneous beams may be formed (therefore capable of attaining N/2 different addressees) sharing the same radioelectric resource (i.e. the same frequency channel).

In the case when the tested parameter during step 300 does not indicate a critical condition of the aircraft, the radioelectric beam emitted during step 600 is generated by a plurality of antennas, for example all the antennas A1-An. The thereby produced beam is thus a directional beam.

In the case when the tested parameter during step 300 indicates a critical condition of the aircraft, a sub-set of antennas is activated, for example only one if it is desired to emit a beam in an omnidirectional way.

Moreover, in the case when the tested parameter during step 300 indicates a critical condition of the aircraft, different strategies for transmitting the data recorded by the black box may be contemplated.

According to a first strategy, the black box data are replicated for each of the activated antennas. The radioelectric signal emitted by each activated antenna thus transports a copy of the same data collected by the black box.

This first strategy provides redundancy in the transmitted data; an aircraft receiving these redundant data may thus apply processing operations including comparisons and/or combinations carried out on the different copies of received data in order to produce a unique copy, characterized by a higher signal-to-noise ratio than that of the received copies considered separately, so that the degradation level of the transmitted data due to the transmission channel will be reduced. For a Gaussian transmission channel, a reception gain at most equal to $10 \log_{10}(N)$ may be obtained, N being the number of copies emitted for the same data.

According to a second alternative strategy to the first strategy, the black box data are split into several data flows, each flow being assigned to one of the activated antennas. Each activated antenna thus emits a radioelectric signal conveying the data flow which was assigned to it. In this strategy, the different activated antennas do not convey the same data simultaneously; in other words, the radioelectric beam is in this case formed with several radioelectric signals which each convey specific data.

The data splitting may typically comprise demultiplexing of the data in order to obtain the different flows to be assigned to the activated antennas.

With the second strategy based on splitting the data, the energy transmitted per bit is increased as compared with the first strategy. Indeed, if the intention is for example split a constant binary flow, with a rate of 1 Mbit/s, into 10 sub-flows, each of the obtained sub-flows will be with a rate of 100 kbit/s. The bit period T therefore increases: it passes from 1 μs per bit to 10 μs. If the power P with which a sub-flow is emitted is the same as the one used for emitting the initial flow (and if the modulation scheme used for modulating the sub-flow is the same) then the energy transmitted per bit (=P*T) increases by a factor 10.

Thus, at constant emitted total energy, the transmission has a much further range; and at a constant transmission distance, the binary error rate is improved.

The activated antennas may be configured for emitting in different frequency channels (i.e. emit radioelectric signals having different frequency ranges), which gives the possibility of having the sending of data in parallel by the different active antennas while allowing discrimination of the data on the receiving side. In this case, a preliminary base band signal is generated by the aircraft, and then this base band signal is transposed in frequency and modulates different carriers so as to obtain the different radioelectric signals emitted in different frequency channels.

The two transmission modes described (respectively associated with the presence of a critical condition or not) may then be applied by means of the same network of antennas Ai in a very simple way, without requiring any piece of transmission equipment dedicated to either one of these modes, and the switching from one mode to the other may be carried out very rapidly by simple switching (activation or deactivation) of some of the antennas A1-An.

A specific header (the equivalent of a digital "mayday") may further be included into the emitted signal in order to indicate the urgent and priority natures of the emission.

In both of the described scenarios (critical condition or not), the data to be transmitted may be ciphered (preferably by means of ciphering of the PKI type) in order to preserve their confidentiality.

As the aircraft 1 is able to encounter several aircrafts 2 on its route, the data which it has transmitted by means of the described steps may be fragmented. In order to be able to crosscheck and assemble these fragmented data (typically by a ground station), a header may advantageously be incorporated to the emitted data, notably indicating the time upon emission (coordinated universal time), the identity of the emitting aircraft, that of the receiving aircraft and that of the preceding crossed aircraft.

The data transmitted from aircraft 1 to aircraft 2 may be those collected by the flight recorder B during a time interval corresponding to the elapsed time from the crossing of the aircraft 1 with a third party aircraft not illustrated in the figures.

Redundancy may however be introduced into the data transmitted by the aircraft 1 by for example transmitting the time interval and a preceding time interval. If this is the case, the binary throughput may be doubled.

In a first embodiment, after its landing, the aircraft queries a local server in order to be informed on the status and on the condition of the M aircraft crossed during the flight. The accumulated data are only transferred to network in the case of an incident/accident.

In a second embodiment, the aviation authority may request and force if need be that the flight data be transmitted to it, of the aircraft which are subject to investigation. These data would then be transferred on a server of the civil aviation authority of the location of the incident or of the accident.

Other Embodiments

The parameter tested during step 300 may be a Boolean variable but may generally assume more than two values, each value being indicative of a respective failure level. Thus the distinction may be made between damage conditions of low importance and critical conditions.

For each value of the parameter, a corresponding directivity and/or a corresponding power may be configured in the emitter A by the control module C. Thus, the conditions of emissions are finely adapted to the importance level of the damage(s) detected in the aircraft 1.

The invention claimed is:

1. A method for transmitting in flight data recorded by a black box of an aircraft, the method comprising emitting by the aircraft a radioelectric beam conveying said data along a first directivity if at least one predetermined parameter does not indicate a critical condition of the aircraft, and along a second directivity different from the first directivity if the predetermined parameter indicates a critical condition of the aircraft wherein the emitted radioelectric beam (F1, F2) is generated by:
activating a set of antennas (A1-An) of the aircraft, if the parameter does not indicate a critical condition of the aircraft, and
selectively activating a sub-set (Ai) of the set of antennas, if the parameter indicates a critical condition of the aircraft.

2. The method according to claim 1, wherein the second directivity is smaller than the first directivity.

3. The method according to claim 1, wherein emitting the radioelectric beam along the first directivity is applied in response to detecting a position of another aircraft in flight within radioelectric range, the emitted radioelectric beam then being oriented towards the detected position.

4. The method according to claim 1, wherein emitting the radioelectric beam along the second directivity is repeated.

5. The method according to claim 1, wherein the radioelectric beam along the second directivity is emitted in an omnidirectional way.

6. The method according to claim 1, wherein the radio beam is emitted according to a first power if the parameter does not indicate a critical condition, and according to a second power greater than the first power if the parameter indicates a critical condition.

7. The method according to claim 1, wherein the determined parameter is emitted in the radioelectric beam.

8. The method according to claim 1, wherein each antenna is an omnidirectional antenna.

9. The method according to claim 1, comprising activating a plurality of antennas of the aircraft, each antenna generating a radioelectric signal conveying a copy of the data recorded by the black box if the parameter indicates a critical condition of the aircraft.

10. The method according to claim 9, wherein each radioelectric signal is emitted in a distinct frequency channel.

11. The method according to claim 1, comprising splitting the data recorded by the black box into several data flows, and activating a plurality of antennas of the aircraft, wherein each antenna generates a radioelectric signal conveying one of the data flows if the parameter indicates a critical condition of the aircraft.

12. A transmission system for an aircraft comprising:
a flight recorder of the black box type,
an emitter of a radioelectric beam conveying data collected by the flight recorder,
the system being characterized in that it further comprises:
a diagnostic module configured for determining at least one parameter either indicating or not a critical condition of the aircraft, and
a control module configured for adjusting the directivity of the emitter according to the determined parameter wherein the emitter (A) comprises a plurality of antennas (A1-An),
and wherein the control module (C) is configured for:
activating the plurality of antennas (Ai-An) if the parameter does not indicate a critical condition of the aircraft, and
selectively activating a sub-set (Ai) of the plurality of antennas if the parameter indicates a critical condition of the aircraft.

13. The system according to claim 12, wherein the antennas are omnidirectional.

14. The system according to claim 12, wherein the sub-set consists of a single omnidirectional antenna.

\* \* \* \* \*